(12) United States Patent
Zhang et al.

(10) Patent No.: US 10,613,402 B2
(45) Date of Patent: Apr. 7, 2020

(54) DISPLAY PANEL WITH ARRAY SUBSTRATE HAVING THICKNESS VARYING IN PACKAGING AREA, METHOD OF MANUFACTURING DISPLAY PANEL AND DISPLAY DEVICE

(71) Applicant: SHANGHAI TIANMA AM-OLED CO., LTD., Shanghai (CN)

(72) Inventors: Peng Zhang, Shanghai (CN); Congyi Su, Shanghai (CN)

(73) Assignee: SHANGHAI TIANMA AM-OLED CO., LTD., Shanghai (CN)

( * ) Notice: Subject to any disclaimer, the term of this patent is extended or adjusted under 35 U.S.C. 154(b) by 162 days.

(21) Appl. No.: 15/792,629

(22) Filed: Oct. 24, 2017

(65) Prior Publication Data
US 2018/0335677 A1    Nov. 22, 2018

(30) Foreign Application Priority Data
May 22, 2017 (CN) .......................... 2017 1 0365143

(51) Int. Cl.
*G02F 1/1362* (2006.01)
*G02F 1/1343* (2006.01)
(Continued)

(52) U.S. Cl.
CPC ...... *G02F 1/136286* (2013.01); *G02F 1/1339* (2013.01); *G02F 1/1343* (2013.01); *G02F 1/1345* (2013.01); *G02F 1/133345* (2013.01); *G02F 2001/133331* (2013.01); *G02F 2001/133388* (2013.01)

(58) Field of Classification Search
CPC ............. G02F 1/136286; G02F 1/1343; G02F 1/133345; G02F 2001/133331; G02F 2001/133388; G02F 1/1339; G02F 1/1345; G02F 1/133512; G02F 1/133308; G02F 2202/28; G02F 1/1333; G02F 1/136209; G02F 2001/13332; H01L 51/5243; H01L 51/56; H01L 29/78633; H01L 27/124; H01L 27/3244; H01L 51/5246; H01L 2251/558; G02B 6/0088
See application file for complete search history.

(56) References Cited

U.S. PATENT DOCUMENTS 7,061,567 B2 * 6/2006 Murade ............. G02F 1/133512
349/110
2016/0285042 A1    9/2016 Choi
(Continued)

OTHER PUBLICATIONS

Chinese, 1st Office Action dated Jun. 1, 2018.

*Primary Examiner* — Huyen L Ngo
(74) *Attorney, Agent, or Firm* — Alston & Bird LLP

(57) ABSTRACT

The present application discloses a display panel, a method of manufacturing the display panel, and a display device. The display panel comprises an array substrate, a cover plate and frame glue, wherein the array substrate comprises a first metal strip and a second metal strip arranged in a packaging area; in the packaging area on a given side of a display area, the first metal strip comprises a plurality of first metal lines, the second metal strip comprises a plurality of second metal lines, and the first metal lines and the second metal lines intersect; and the array substrate has a maximum thickness at locations where the first metal lines intercept second metal lines.

19 Claims, 8 Drawing Sheets

(51) Int. Cl.
 *G02F 1/1333* (2006.01)
 *G02F 1/1339* (2006.01)
 *G02F 1/1345* (2006.01)

(56) References Cited

U.S. PATENT DOCUMENTS

2017/0250365 A1* 8/2017 Jin ...................... H01L 27/3244
2017/0294623 A1* 10/2017 Gai ........................ H01L 51/56

* cited by examiner

DISPLAY PANEL WITH ARRAY SUBSTRATE HAVING THICKNESS VARYING IN PACKAGING AREA, METHOD OF MANUFACTURING DISPLAY PANEL AND DISPLAY DEVICE

CROSS-REFERENCE TO RELATED APPLICATION

This application is related to and claims priority from Chinese Patent Application No. CN201710365143.6, filed on May 22, 2017, entitled "Display Panel, Method of Manufacturing Display Panel and Display Device", the entire disclosure of which is hereby incorporated by reference for all purposes.

TECHNICAL FIELD

The present application generally relates to the technical field of display, and particularly to a display panel, a manufacturing method of the display panel, and a display device.

BACKGROUND

Frit packaging is a common packaging form for a display panel (e.g., an organic light-emitting display panel), and FIG. 1A and FIG. 1B show an example of packaging a display panel by using a frit technique in the prior art.

As shown in FIG. 1A, the display panel may generally include a display area 191 and a packaging area 192 outside the display area 191. As shown in FIG. 1B, in the packaging area 192, the display panel may include an array substrate 11, a cover plate 12, and a frit compound 13 from fusing the array substrate 11 and the cover plate together. In the prior art, a metal strip 14 (on which an insulating film is deposited which is not shown here) is usually arranged on a glass substrate 10 of the array substrate 11, and the frit compound 13 is formed between the array substrate 11 and the cover plate 12 during a high temperature and high pressure molten process followed by curing, by a heat source, for example, a laser light.

However, in the prior art, the surface of the metal strip 14 interfacing the frit 13 is flat, and flat contact surface has limited adhesion, which may cause poor sealing, resulting in water vapor, oxygen and the like entering the display panel to deteriorate liquid crystal molecules or an organic light-emitting material. Eventually the display will lose its function. To increase the packaging area adhesion, it might be necessary to widen the packaging area (thus increasing the contact area between the metal strip 14 and the frit 13). However this is contrary to a development trend of a narrow frame.

In view of the defects or shortcomings in the prior art, a display panel, a manufacturing method of the display panel, and a display device are expected to be provided, so as to solve the technical problems existing in the prior art.

SUMMARY

According to one aspect of the present application, a display panel is provided and includes an array substrate, a cover plate and frame glue for gluing the array substrate and the cover plate together, wherein the array substrate includes a first metal strip and a second metal strip arranged in a packaging area which surrounds a display area, and the frame glue is arranged in the packaging area; in the packaging area on a given side of the display area, the first metal strip includes a plurality of first metal lines, the second metal strip includes a plurality of second metal lines, and the first metal lines and the second metal lines intersect; and in a direction perpendicular to the display panel, the array substrate has a thickness varying in the packaging area, and has a maximum thickness in an area where the first metal lines overlap the second metal lines.

According to another aspect of the present application, a manufacturing method of the display panel is further provided, and includes: depositing a first metal film; etching the first metal film to form a first metal strip in the packaging area; depositing a second metal film; etching the second metal film to form a second metal strip in the packaging area; coating the frame glue in the packaging area; and fitting the cover plate and curing the frame glue to glue the cover plate and the array substrate together, wherein the array substrate includes a first metal strip and a second metal strip, and in the packaging area on an identical side of the display area, the first metal strip includes a plurality of first metal lines, the second metal strip includes a plurality of second metal lines, the first metal lines and the second metal lines intersect, and the packaging area surrounds the display area; and in a direction perpendicular to the display panel, the array substrate has a thickness varying in the packaging area, and a maximum thickness in an area where the first metal lines overlap the second metal lines.

According to another aspect of the present application, a display device is further provided, and comprises the display panel as shown above.

According to the display panel, the manufacturing method of the display panel, and the display device, provided by the present application, by setting two layers of the metal lines as a package substrate in the packaging area, and enabling the metal lines of different layers to intersect, the array substrate has a thickness varying in the packaging area to increase the contact area between the frame glue and the array substrate, thereby improving reliability of packaging.

BRIEF DESCRIPTION OF THE DRAWINGS

Other features, objectives and advantages of the present application will become more apparent by reading a detailed description of the non-restrictive embodiments made with reference to the following drawings.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1A:
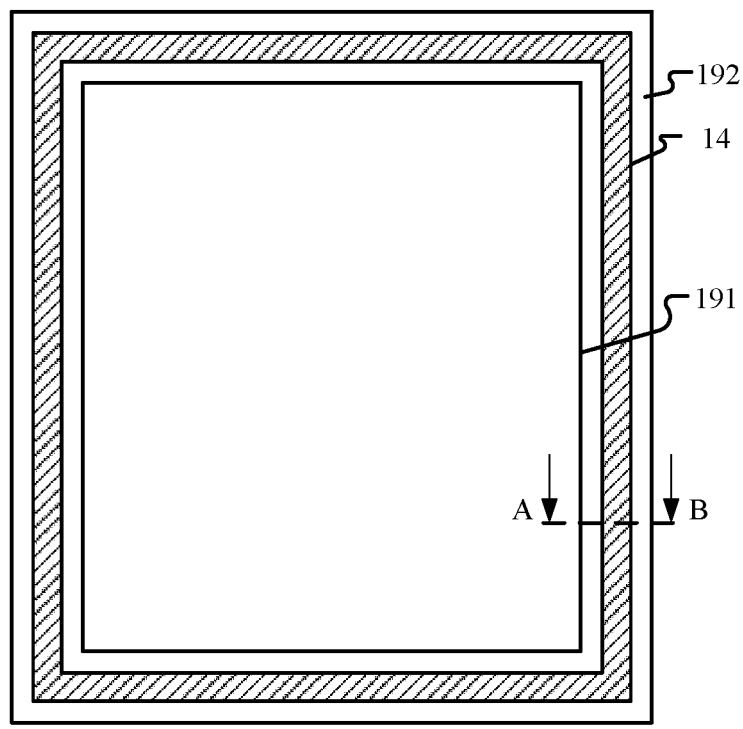
FIG. 1A shows a top view of a display panel of the prior art.
Figure 1B:
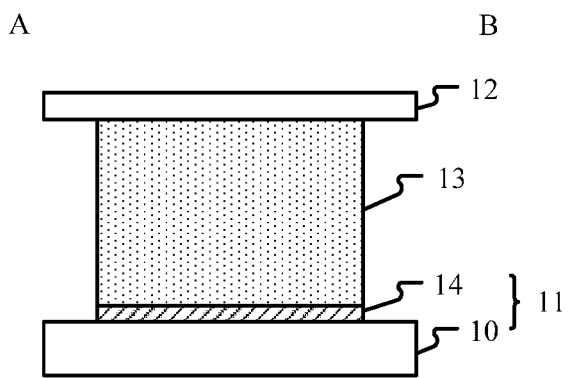
FIG. 1B is a cross sectional view along cutline AB through an edge of FIG. 1A.
Figure 2A:
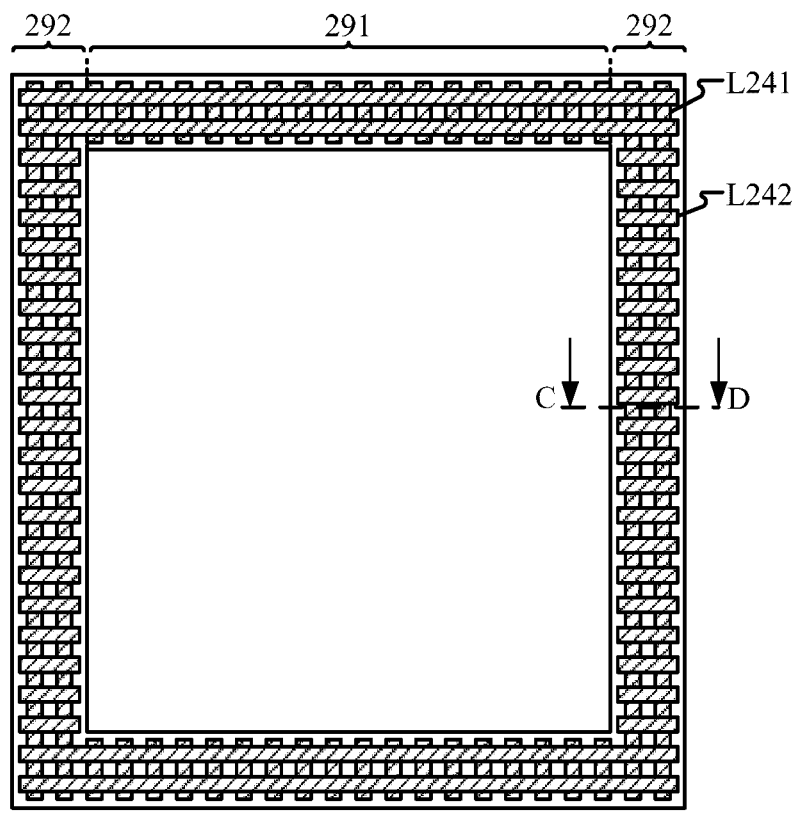
FIG. 2A shows a top view of a display panel in accordance with one embodiment of the present application.
Figure 2B:
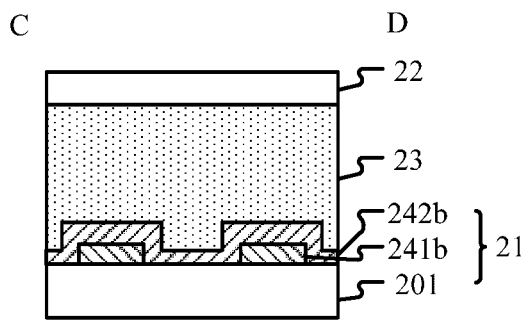
FIG. 2B is a cross sectional view along cutline CD through an edge of FIG. 2A.
Figure 2C:
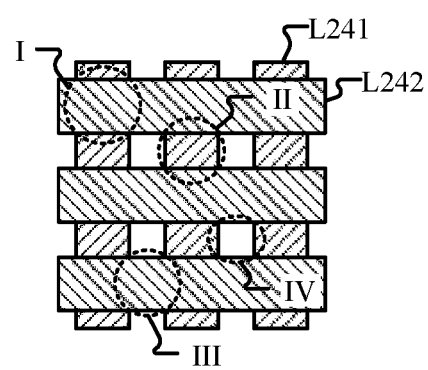
FIG. 2C is a zoomed in view of an frit area of FIG. 2A.

FIG. 2A shows a top view of the display panel in accordance with one embodiment of the present application, FIG. 2B shows a cross sectional view of the edge cut line CD shown in FIG. 2A, and FIG. 2C is a enlarged schematic diagram of FIG. 2A.

As shown in FIG. 2A and FIG. 2B, the display panel may include an array substrate 21, a cover plate 22, and frame glue 23 for gluing the array substrate 21 and the cover plate 22 together, and the frame glue 23 is arranged in a packaging area 292.

The array substrate 21 may include a first metal strip 241b that is also named as a first metal layer and a second metal strip 242b arranged in a packaging area 292 and also named as a second metal layer, and in the packaging area 292 on the same side of a display area 291, the first metal strip 241b may include a plurality of first metal lines L241, the second metal strip 242b may include a plurality of second metal lines L242, and the first metal lines L241 and the second metal lines L242 may intersect. Here, the packaging area 292 surrounds the display area 291.

In a direction perpendicular to the display panel, the array substrate 21 has a thickness varying in the packaging area 292, and has a maximum thickness in an area where the first metal lines L241 overlap the second metal lines L242.

Specifically, because the first metal lines L241 and the second metal lines L242 intersect, and have a certain film thickness respectively, the packaging area may be divided into several different areas according to a positional relationship between the first metal lines L241 and the second metal lines L242, for example, an area I covered by the first metal lines L241 and the second metal lines L242, an area II covered only by the first metal lines L241, an area III covered only be the second metal lines L242, and an area IV not covered by the first metal lines L241 and the second metal lines L242, as shown in FIG. 2C.

Wherein, the array substrate 21 may have a first thickness in the area I, a second thickness in the area II, a third thickness in the area III, and a fourth thickness in the area IV. Here, the first thickness>the second thickness/the third thickness>the fourth thickness, and the second thickness and the third thickness may be or not be identical.

Thus, when the array substrate 21 and the cover plate 22 are glued together by the frame glue 23, the frame glue 23 and the array substrate 21 are glued together in the above areas by contacting each other, and this kind of uneven rough surface causes the contact area between the array substrate 21 and the frame glue 23 to increase greatly, thereby improving the adhesion force between the frame glue 23 and the array substrate 21.

In the present embodiment, by setting two layers of the metal lines (e.g., the first metal lines and the second metal lines) as a package substrate in the packaging area, and enabling the metal lines of different layers to intersect, the array substrate has a thickness varying in the packaging area to increase the contact area between the frame glue and the array substrate, thereby improving reliability of packaging.

Compared with flat contact of the prior art, because the contact area between the frame glue and the array substrate is increased, the area occupied by the packaging area may be reduced, for example, by at least 30% of the packaging area under the condition that the packaging reliability of the display panel of the present embodiment is ensured, which facilitates implementation of a narrow frame.

The present embodiment further has the beneficial effects that: on the one hand, because a metal has a better thermal conduction characteristic, the first/second metal strips can dissipate heat to avoid local overheating during melting of the frame glue; and on the other hand, when alight source, for example, a laser light source, an ultraviolet light source or the like is used to cure the frame glue, the utilization ratio of the light source may be improved and the power of the light source may be reduced due to reflection characteristics of the metal strip.

In addition, the first/second metal strips are arranged in the form of a plurality of metal wires, and the metal stress generated in a technical process may be released more fully to avoid encapsulation failure due to deformation.

Although FIG. 2A shows that the first metal lines L241 and the second metal lines L242 are perpendicular to each other, but this is only schematic. It should be appreciated that, the first metal lines L241 and the second metal lines L242 can be in any suitable angle, as long as the first metal lines L241 and the second metal lines L242 intersect, which may be set by those skilled in the art according to needs of actual application scenarios.

Although FIG. 2B shows that the second metal strip 242b is arranged over the first metal strip 241b, it should be understood that the position of the second metal strip 242b and the position of the first metal strip 241b can be interchanged, for example, the first metal strip 241b may be arranged over the second metal strip 242b.

Although FIG. 2B shows that a contact surface between the cover plate 22 and the frame glue 23 is flat, it should be understood that a rough surface similar to the contact surface between the frame glue 23 and the array substrate 21 may also be formed between the cover plate 22 and the frame glue 23 to further improve the reliability of packaging.

In addition, the frame glue 23 may be a frit, but the present embodiment is not limited to this. The frame glue may also be other suitable adhesives, for example, an ultraviolet curing adhesive and the like.

Optionally, the display panel is a liquid crystal display panel.

When the display panel is a liquid crystal display panel, the cover plate 22 may be a color film substrate, the display panel may further include a liquid crystal layer between the array substrate 21 and the color film substrate 22, and liquid crystal molecules in the liquid crystal layer are sealed between the two substrates by the frame glue 23.

Optionally, the display panel is an organic light-emitting display panel.

When the display panel is an organic light-emitting display panel, the display panel may further include organic light-emitting diodes which may include cathodes, anodes and an organic light-emitting layer between the cathodes and the anodes. The organic light-emitting diodes are sealed between the array substrate 21 and the cover plate 22 by the frame glue 23.

Hereinafter, a process flow for manufacturing the display panel of the present embodiment will be described with reference to FIG. 3A-FIG. 3C.

Figure 3A:
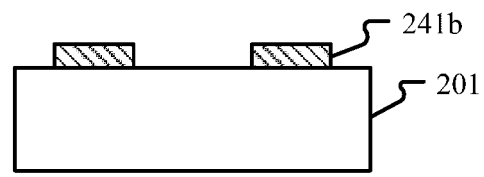
FIG. 3A-FIG. 3C show a schematic diagram of a preparation process of the display panel in accordance with embodiments shown by FIG. 2A and FIG. 2B.

Firstly, the first metal film is deposited on a base substrate 201 of the array substrate 21, and is etched to form the first metal strip 241b in the packaging area 292, as shown in FIG. 3A.

Wherein, the first metal strip 241b may include a plurality of first metal lines which are arranged in parallel with one another.

Figure 3B:
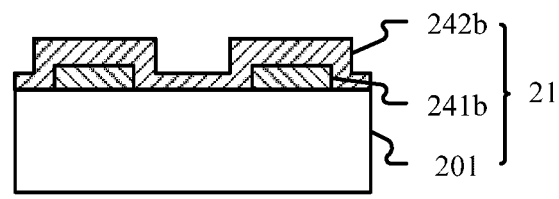

Then, the second metal film is deposited on the base substrate 201 and the first metal strip 241b, and is etched to form the second metal strip 242b in the packaging area 292, as shown in FIG. 3B.

Wherein, the second metal strip 242b may include a plurality of second metal lines which are arranged in parallel with one another. In addition, the second metal lines and the first metal lines intersect.

Figure 3C:
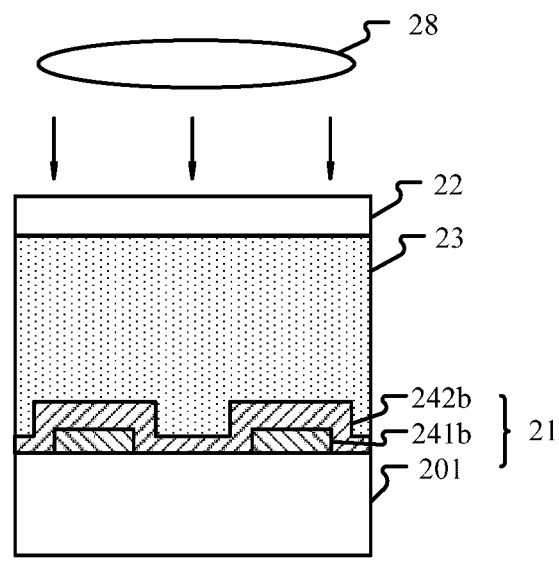

Finally, the frame glue 23 is coated in the packaging area 292, the cover plate 22 is fitted, and the frame glue 23 is cured to glue the cover plate 22 and the array substrate 21 together, as shown in FIG. 3C. Wherein, an energy source 28 (for example, laser light, ultraviolet light and the like) may be used to apply energy to the frame glue 23 to melt and cure the fame glue 23.

The manufacturing of the display panel of the present embodiment is implemented through the above steps, and it can be seen from the FIGS. that the display panel manufactured by the above steps has an uneven rough surface formed between the frame glue 23 and the array substrate 21 to increase the contact area between them.

Those skilled in the art may understand that 3C, a description of some known manufacturing process steps is neglected when a manufacturing process of the display panel of the present embodiment is described in conjunction with FIG. 3A-FIG. 3C. In order not to obscure an inventive point of the present embodiment, no further detailed description of the known manufacturing process steps is provided here.

Figure 4:
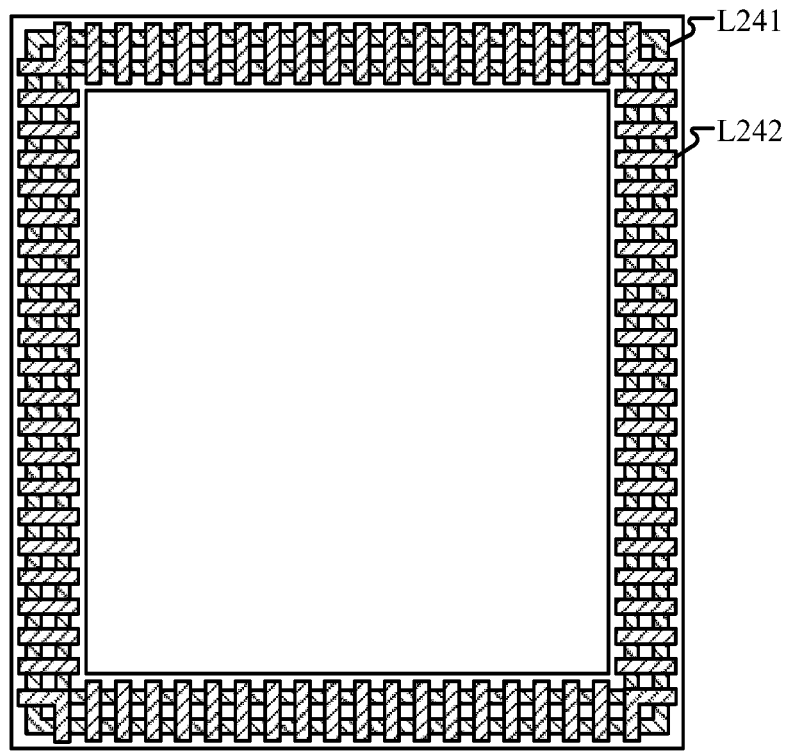
FIG. 4 shows a schematic diagram of another implementation mode of the embodiment shown in FIG. 2A.

It should be noted that although the first metal lines L241 may be parallel to one another, and the second metal lines L242 may be parallel to one another, as shown in FIG. 2A, but the present embodiment is not limited to this. In some optional implementation modes, the first metal lines L241 or the second metal lines L242 may intersect. For example, in the implementation mode shown in FIG. 4, the second metal lines L24 positioned on adjacent two sides of the display area respectively may intersect in an extension direction.

Optionally, the array substrate further includes a first insulating sheet and a second insulating sheet arranged in a packaging area, the first insulating sheet covers the first metal strip, and the second insulating sheet covers the second metal strip.

Figure 5:
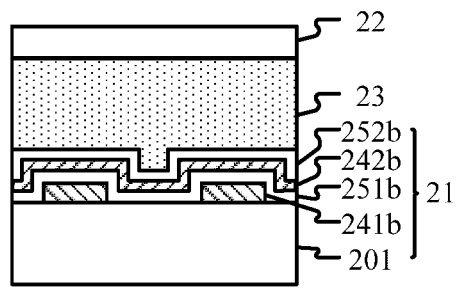
FIG. 5 shows a cross sectional view in accordance with another implementation mode of the embodiment shown in FIG. 2A.

As shown in FIG. 5, the array substrate 21 may further include a first insulating sheet 251b and a second insulating sheet 252b arranged in a packaging area, the first insulating sheet 251b covers the first metal strip 241b, and the second insulating sheet 252b covers the second metal strip 242b.

Generally speaking, the surface adhesion force between an insulating material (e.g., an inorganic insulating material) and the frame glue 23 is stronger than that of a metal material. Therefore, the adhesion force between the frame glue 23 and the array substrate 21 may be further strengthened by setting the first insulating sheet 251b and the second insulating sheet 252b to improve the reliability of packaging.

Optionally, the first insulating sheet 251b and/or the second insulating sheet 252b is made from at least one of silicon nitride or silicon oxide.

The frame glue 23 usually is an adhesive containing silicon (Si), and when the insulating sheet contains silicon nitride, silicon oxide and other insulating materials containing silicon, and the frame glue 23 and the first insulating sheet 251b/the second insulating sheet 252b are in adhesive contact, the intermolecular force of a contact surface is greater than that when the substrate material contains no silicon. Thus, the packaging reliability of the display panel may be further strengthened by using silicon nitride and/or silicon oxide to manufacture the first insulating sheet 251b and the second insulating sheet 252b.

Figure 6:
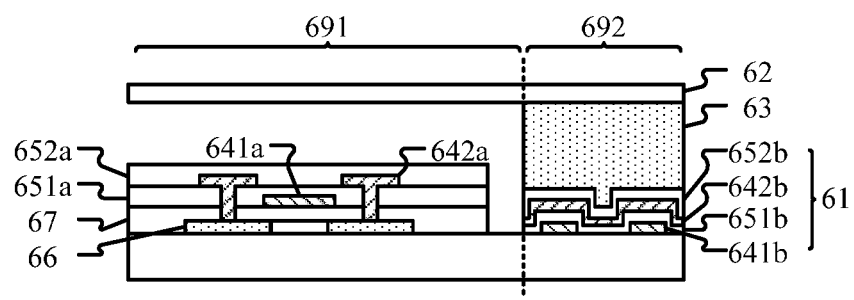
FIG. 6 shows a cross sectional view of a display panel in accordance with another embodiment of the present application.

Continue to refer to FIG. 6, it shows a cross sectional view of the display panel of another embodiment of the present application.

Similar to the display panel shown in FIG. 5, the display panel in the present embodiment may also include an array substrate 61, a cover plate 62 and frame glue 63. The array substrate 61 may also include a first metal strip 641b, a first insulating sheet 651b, a second metal strip 642b and a second insulating sheet 652b arranged in a packaging area 692.

Unlike the display panel shown in FIG. 5, as shown in FIG. 6, the array substrate 61 in the present embodiment may further include a gate electrode layer 641a, a first insulating layer 651a, a source/drain electrode layer 642a and a second insulating layer 652a arranged in a display area 691. Wherein, the first insulating layer 651a covers the gate electrode layer 641a, and the second insulating layer 652a covers the source/drain electrode layer 642a.

Specifically, the first metal strip 641b and the gate electrode layer 641a may be positioned in a same layer and manufactured in an identical patterning process, and the second metal strip 642b and the source/drain electrode layer 642a may be positioned in a same layer and manufactured in an identical patterning process. Correspondingly, the first insulating sheet 651b and the first insulating layer 651a may be positioned in a same layer and manufactured in an identical patterning process, and the second insulating sheet 652b and the second insulating layer 652a may be positioned in a same layer and manufactured in an identical patterning process.

Here, the gate electrode layer 641a and the first metal strip 641b are positioned in a same layer, which refers to that the gate electrode layer 641a and the first metal strip 641b are formed by a same layer of metal film, and may have different distances between them and a base substrate in a direction perpendicular to the display panel.

In this way, the first metal strip 641b, the first insulating sheet 651b, the second metal strip 642b and the second insulating sheet 652b may be formed while the gate electrode layer 641a, the first insulating layer 651a, the source/drain electrode layer 642a and the second insulating layer 652a are formed, so that no additional manufacturing process is required, and the process difficulty is not increased.

In the present embodiment, by setting the insulating sheets on the metal strips, the adhesion force of a contact surface is strengthened and the reliability of packaging is improved on the basis of increasing the contact area between the frame glue and the array substrate. Moreover, the manufacturing process of the display panel is simplified by setting the first metal strip and the gate electrode layer in a same layer, and the second metal strip and the source/drain electrode layer in a same layer.

Although FIG. 6 shows that the first metal strip 641b and the gate electrode layer 641a are in a same layer, and the second metal strip 642b and the source/drain electrode layer 642a are in a same layer, the present embodiment is not limited to this. It should be understood that, the first metal strip 641b and the second metal strip 642b may be interchangeable, i.e., the first metal strip 641b and the source/drain electrode layer 642a may be in a same layer, and the second metal strip 642b and the gate electrode layer may be in a same layer.

In addition, the array substrate 61 may further include some known structures in addition to the above structure, for example, a semiconductor layer 66, a gate insulating layer 67 and the like, and in order not to obscure the focus of the present embodiment, these known structures will no longer be further described.

Hereinafter, the process flow of manufacturing the display panel of the present embodiment will be described by using the first metal strip 641b and the gate electrode layer 641a being in a same layer, and the second metal strip 642b and the source/drain electrode layer 642a being in a same layer as an example in conjunction with FIGS. 7A-7E and FIGS. 8A-8B.

Figure 7A:
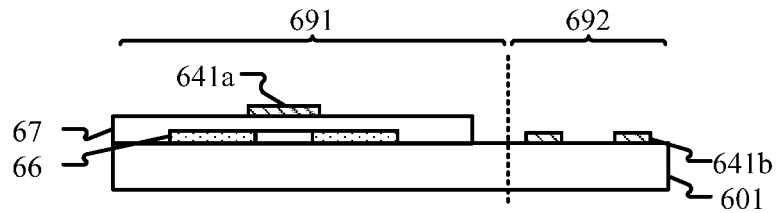
FIG. 7A-FIG. 7E show a schematic diagram of a preparation process of a display panel in accordance with an embodiment shown by FIG. 6.

Firstly, the first metal film is deposited on a base substrate 601 of the array substrate 61 to form the gate electrode layer 641a in the display area 691 and the first metal strip 641b in the packaging area 692 through one patterning process, as shown in FIG. 7A. Wherein, the first metal strip 641b includes a plurality of first metal lines (not shown).

The patterning process in this step may include: forming a first photoresist pattern on the first metal film, wherein the first photoresist pattern covers an area in which the gate electrode layer 641a is to be formed in the display area 691 and covers an area in which the first metal strip 641b is to be formed in the packaging area 692; etching the first metal film to remove an area not covered with the first photoresist pattern; and removing the first photoresist pattern. Through the above process, the gate electrode layer 641a and the first metal strip 641b are formed on the first metal film at the same time.

In addition, in order to better describe the manufacturing method of the present embodiment, FIG. 7A also shows that a semiconductor layer 66 and a gate insulating layer 67 are formed in the display area 691 of the base substrate 601 before the first metal film is deposited.

Figure 7B:
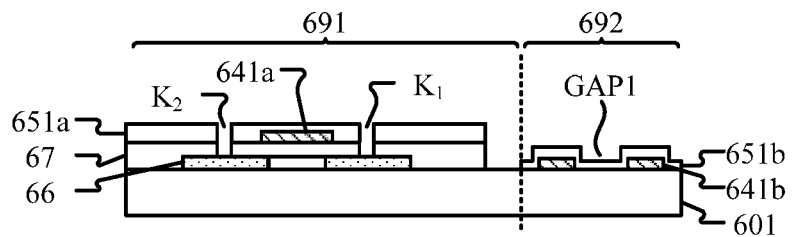

Then, the first insulating film is deposited on the gate electrode layer 641a and the first metal strip 641b to form the first insulating layer 651a in the display area 691 and form a first insulating sheet 651b in the packaging area 692, as shown in FIG. 7B.

Figure 8A:
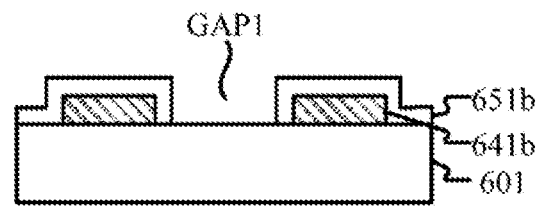
FIG. 8A shows a schematic diagram of another implementation mode of the preparation process shown in FIG. 7B.

Optionally, the first insulating sheet 651b in an area GAP1 between the first metal lines is etched, as shown in FIG. 8A, to enable the array substrate 61 to have a greater height difference (in a direction perpendicular to the display panel) in the area GAP1, thereby further increasing the contact area between the frame glue 63 and the array substrate 61.

Although FIG. 8A shows that the first insulating sheet 651b is etched through in the area GAP1, but this is only schematic. It should be appreciated that, the first insulating sheet 651b may also be partially etched (not etched through) in the area GAP1 to keep part of the thickness.

The first insulating sheet 651b and the first insulating layer 651a may be carried out at the same time. For example, when a part (for example, a part of a source area and a drain area) of the semiconductor layer 66 is required to be exposed, the first insulating layer 651a and the gate insulating layer 67 may be etched to form contact holes K1 and K2 that expose the part of the semiconductor layer 66. In other words, the first insulating sheet 651b is etched without requiring an additional process, thereby simplifying the manufacturing process.

Figure 7C:
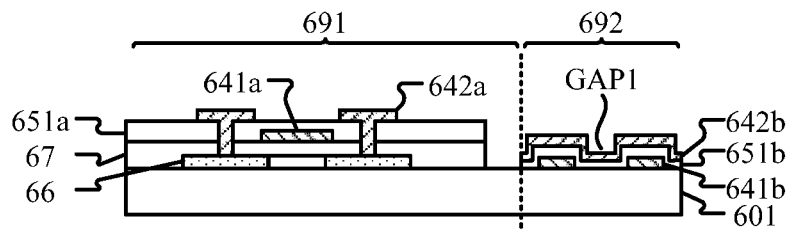

Then, the second metal film is deposited on the first insulating layer 651a and the first insulating sheet 651b to form the source/drain electrode layer 642a in the display area 691 and the second metal strip 642b in the packaging area 692 through one patterning process, as shown in FIG. 7C. Wherein, the second metal strip 642b includes a plurality of second metal lines which intersect with the first metal lines.

The patterning process in this step may include: forming a second photoresist pattern on the second metal film, wherein the second photoresist pattern covers an area in which the gate electrode layer 642a is to be formed in the display area 691 and covers an area in which the second metal strip 642b is to be formed in the packaging area 692; etching the second metal film to remove an area not covered with the second photoresist pattern; and removing the second photoresist pattern. Through the above process, the source/drain electrode layer 642a and the second metal strip 642b are formed on the second metal film at the same time.

Figure 8B:
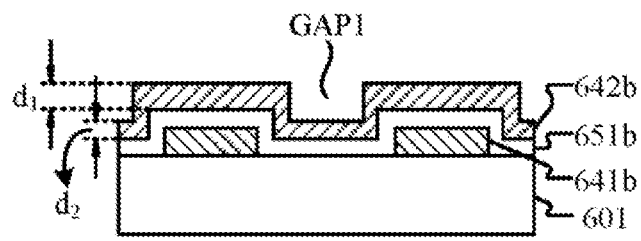
FIG. 8B shows a schematic diagram of another implementation mode of the preparation process shown in FIG. 7C.

It should be noted that, when a mask used in the patterning process is a mask (for example, a halftone mask, a slit mask, etc.) capable of forming a photoresist pattern with a thickness difference, the second metal strip 642b (or the second metal lines) between the first metal lines may also be etched, as shown in FIG. 8B. It can be seen from the FIGS. that, after etching, the thickness $d_2$ of the second metal lines in the area GAP1 is smaller than the thickness $d_1$ of the second metal lines overlapped with the first metal lines, i.e., the array substrate 61 has a greater height difference in the area, thereby increasing the contact area between the frame glue 63 and the array substrate 61.

It should be noted that, the second metal lines in the area GAP1 are not etched through (i.e., completely etched) to facilitate light reflection and heat transfer of the second metal lines.

Figure 7D:
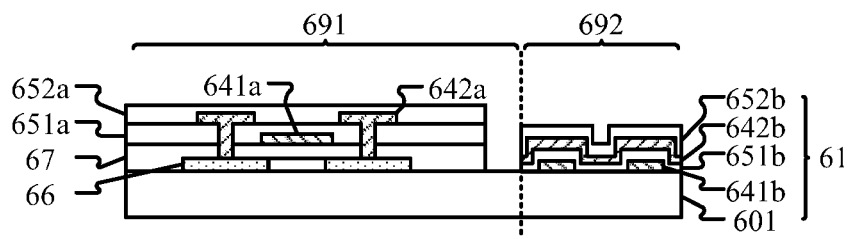

Then, the second insulating film is deposited on the source/drain electrode layer 642a and the second metal strip 641b to form the second insulating layer 652a in the display area 691 and form a second insulating sheet 652b in the packaging area 692, as shown in FIG. 7D.

Optionally, the second insulating sheet 652b in an area between the second metal lines is etched but not etched through to enable the array substrate 61 to have a greater height difference in the area and ensure that the frame glue 63 contacts the second insulating sheet 652*b*, thereby ensuring that the contact surface has a great intermolecular force while the contact area between the frame glue 63 and the array substrate 61 is further increased.

Of course, the second insulating sheet 652*b* in the etched area (area GAP1) on the second metal lines may also be etched (but not etched through) to further increase the contact area between the frame glue 63 and the array substrate 61.

Figure 7E:
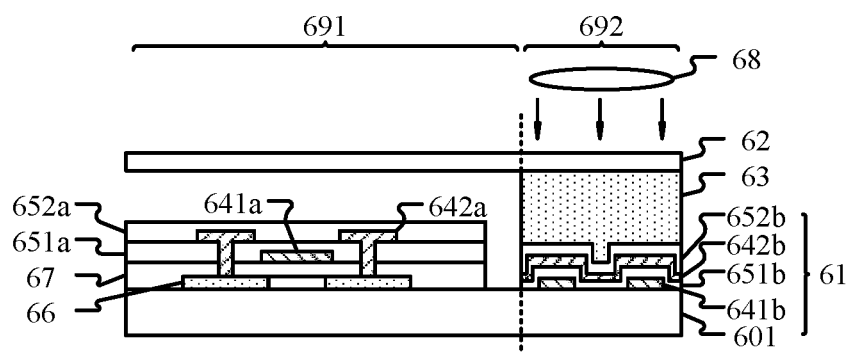

Finally, the frame glue 63 is coated in the packaging area, the cover plate 62 is fitted, and the frame glue 63 is cured to glue the cover plate 62 and the array substrate 61 together, as shown in FIG. 7E. Wherein, an energy source 68 (for example, laser light, ultraviolet light and the like) may be used to apply energy to the frame glue 63 to melt and cure the fame glue 63.

The manufacturing of the display panel of the present embodiment is implemented through the above steps, and it can be seen from the FIGS. that the display panel manufactured by the above steps has an uneven rough surface formed between the frame glue 63 and the array substrate 61 to increase the contact area between them.

Figure 9:
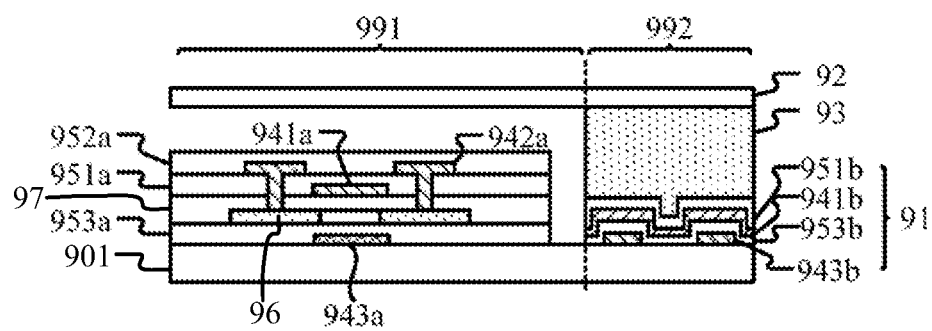
FIG. 9 shows a cross sectional view of a display panel in accordance with another embodiment of the present application.

Continue to refer to FIG. 9, it shows a cross sectional view of the display panel of another embodiment of the present application.

Similar to the embodiment shown in FIG. 6, the display panel in the present embodiment may also include an array substrate 91, a cover plate 92 and frame glue 93. The array substrate 91 may also include a first metal strip 943*b*, a first insulating sheet 953*b*, a second metal strip 941*b* and a second insulating sheet 951*b* arranged in a packaging area 992, and a gate electrode layer 941*a*, a source/drain electrode layer 942*a*, a first insulating layer 951*a* and a second insulating layer 952*a* arranged in a display area 991. A semiconductor layer 96 and a gate insulating layer 97 are arranged on a base substrate 901 and are formed in the display area 991 of the base substrate 901.

Unlike the embodiment shown in FIG. 6, as shown in FIG. 9, the array substrate 91 in the present embodiment may further include a shading metal layer 943*a* and a third insulating layer 953*a* arranged in the display area 991, and the third insulating layer 953*a* may cover the shading metal layer 943*a*.

Specifically, the first metal strip 943*b* and the shading metal layer 943*a* may be positioned in a same layer and manufactured in an identical patterning process, and the second metal strip 941*b* and the gate electrode layer 941*a* may be positioned in a same layer and manufactured in an identical patterning process. Correspondingly, the first insulating sheet 953*b* and the third insulating layer 953*a* may be positioned in a same layer and manufactured in a same patterning process, and the second insulating sheet 951*b* and the first insulating layer 951*a* may be positioned in a same layer and manufactured in a same patterning process.

In this way, the first metal strip 943*b*, the first insulating sheet 953*b*, the second metal strip 941*b* and the second insulating sheet 951*b* may be formed while the gate electrode layer 941*a*, the source/drain electrode layer 942*a*, the first insulating layer 951*a*, the second insulating layer 952*a*, the shading metal layer 943*a* and the third insulating layer 953*a* are formed, so that no additional manufacturing process is required, and the process difficulty is not increased.

In the present embodiment, due to the provided metal strips and the insulating sheets, the effects of increasing the contact area between the frame glue and the array substrate and strengthening the surface adhesion force may also be achieved. At the same time, the shading metal layer and the first/second metal strips may be in a same layer, thereby further enriching structure types of the display panel of the present embodiment.

Although FIG. 9 shows that the first metal strip 943*b* and the shading metal layer 943*a* are in a same layer, and the second metal strip 941*b* and the gate electrode layer 941*a* are in a same layer, the present embodiment is not limited to this. It should be understood that one of the first metal strip 943*b* and the second metal strip 941*b*, and the shading metal layer 943*a* are in a same layer, and the other one of the first metal strip 943*b* and the second metal strip 941*b*, and one of the gate electrode layer 941*a* and the source/drain electrode layer 942*a* are in a same layer. For example, the first metal strip 943*b* and the source/drain electrode layer 942*a* are in a same layer, and the second metal strip 941*b* and the shading metal layer 943*a* are in a same layer, etc., which may be set by those skilled in the art according to needs of actual application scenarios.

Figure 10:
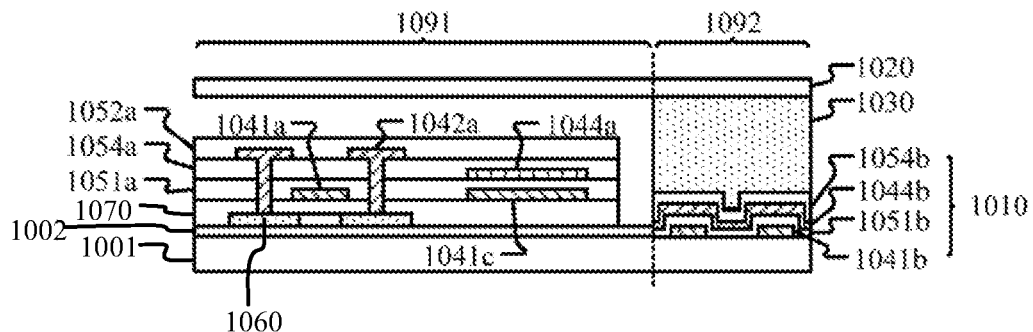
FIG. 10 shows a cross sectional view of the display panel in accordance with another embodiment of the present application.

Continue to refer to FIG. 10, it shows a cross sectional view of the display panel of another embodiment of the present application.

Similar to the embodiment shown in FIG. 6, the display panel in the present embodiment may also include an array substrate 1010, a cover plate 1020 and frame glue 1030. The array substrate 1010 may also include a first metal strip 1041*b*, a first insulating sheet 1051*b*, a second metal strip 1044*b* and a second insulating sheet 1054*b* arranged in a packaging area 1092, and a gate electrode layer 1041*a*, a source/drain electrode layer 1042*a*, a first insulating layer 1051*a* and a second insulating layer 1052*a* arranged in a display area 1091. A semiconductor layer 1060, a gate insulating layer 1070 and a buffer layer 1002 are arranged on a base substrate 1001 and are formed in the display area 1091 of the base substrate 1001.

Unlike the embodiment shown in FIG. 6, as shown in FIG. 10, the array substrate 1010 in the present embodiment may further include a fourth metal layer 1044*a* and a fourth insulating layer 1054*a* arranged in the display area 1091, and the fourth insulating layer 1054*a* may cover the shading metal layer 1044*a*. For example, the fourth metal layer 1044*a* may be a capacitance metal layer, i.e., it can be used as a metal polar plate for storing capacitance, another metal electrode 1041*c* in a same layer with the gate electrode layer 1041*a* may be used as another metal polar plate for storing capacitance, and storage capacitance may then be generated between the two metal polar plates.

Specifically, the first metal strip 1041*b* and the gate electrode layer 1041*a* may be positioned in a same layer and manufactured in an identical patterning process, and the second metal strip 1044*b* and the fourth metal layer 1044*a* may be positioned in a same layer and manufactured in a same patterning process. Correspondingly, the first insulating sheet 1051*b* and the insulating gate layer 1051*a* may be positioned in a same layer and manufactured in a same patterning process, and the second insulating sheet 1054*b* and the fourth insulating layer 1054*a* may be positioned in a same layer and manufactured in an identical patterning process.

In this way, the first metal strip 1041*b*, the first insulating substrate 1051*b*, the second metal substrate 1044*b* and the second insulating sheet 1054*b* may be formed while the gate electrode layer 1041*a*, the source/drain electrode layer 1042*a*, the first insulating layer 1051*a*, the second insulating layer 1052*a*, the fourth metal layer 1044*a* and the fourth insulating layer 1054*a* are formed, so that no additional manufacturing process is required, and the process difficulty is not increased.

In the present embodiment, due to the provided metal strips and the insulating sheets, the effects of increasing the contact area between the frame glue and the array substrate and strengthening the surface adhesion force may also be achieved. At the same time, the fourth metal layer (for example, a capacitance metal layer) and the first/second metal strips may be in a same layer, thereby further enriching structure types of the display panel of the present embodiment.

Although FIG. 10 shows that the first metal strip 1041*b* and the gate electrode layer 1041*a* are in a same layer, and the second metal strip 1044*b* and the fourth metal layer 1044*a* are in a same layer, the present embodiment is not limited to this. It should be understood that one of the first metal strip 1041*b* and the second metal strip 1044*b*, and the fourth metal layer 1044*a* are in a same layer, and the other one of the first metal strip 1041*b* and the second metal strip 1044*b*, and one of the gate electrode layer 1041*a* and the source/drain electrode layer 1042*a* are in a same layer.

In addition, the present application further discloses a manufacturing method of the display panel, which is used for manufacturing the display panels in the above embodiments.

Figure 11:
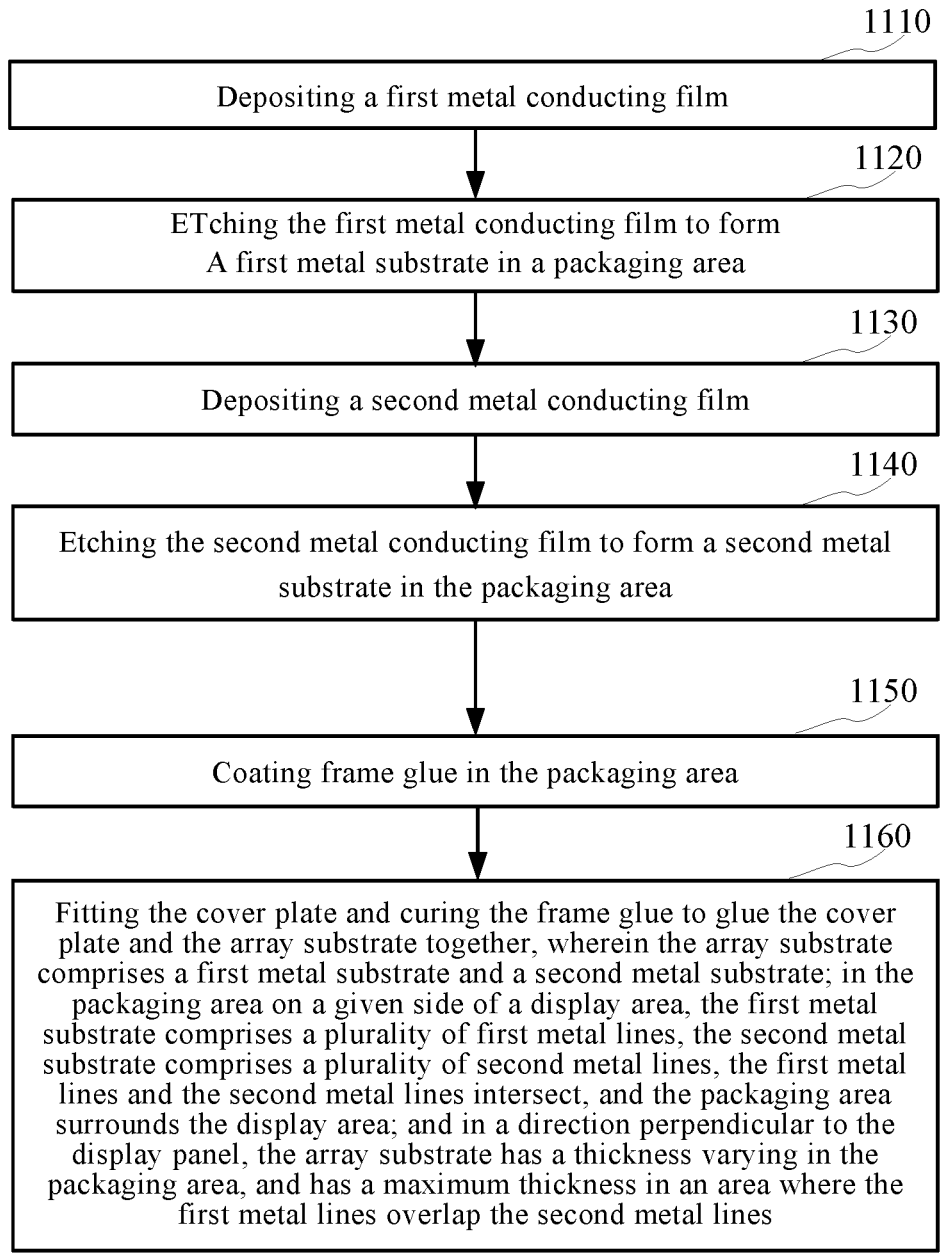
FIG. 11 shows a schematic flow diagram of the manufacturing method of the display panel in accordance with one embodiment of the present application.

FIG. 11 shows a schematic flow diagram the manufacturing method of the display panel in accordance with one embodiment of the present application.

In the present embodiment, the manufacturing method of the display panel may include the following steps:

Step 1110, depositing a first metal film;

Step 1120, etching the first metal film to form a first metal strip in a packaging area;

Step 1130, depositing a second metal film;

Step 1140, etching the second metal film to form a second metal strip in the packaging area;

Step 1150, coating frame glue in the packaging area; and

Step 1160, fitting the cover plate and curing the frame glue to glue the cover plate and the array substrate together, wherein the array substrate comprises a first metal strip and a second metal strip; in the packaging area on a given side of a display area, the first metal strip comprises a plurality of first metal lines, the second metal strip comprises a plurality of second metal lines, the first metal lines and the second metal lines intersect, and the packaging area surrounds the display area; and in a direction perpendicular to the display panel, the array substrate has a thickness varying in the packaging area, and has a maximum thickness in an area where the first metal lines overlap the second metal lines.

It should be noted that, although FIG. 11 shows an execution sequence of Step 1110 to Step 1160, it is only schematic. It should be appreciated that, Step 1110 to Step 1140 may be carried out in a sequence different from the sequence marked in the drawing, for example, Step 1130 and Step 1140 may be carried out prior to Step 1110 and Step 1120, which depends on related functions.

According to the display panel manufactured through the above steps, the array substrate has a thickness varying in the packaging area to form an uneven rough surface between the frame glue and the array substrate, thereby increasing the contact area.

Optionally, the method further includes: depositing a first insulating film to cover the first metal strip in the packaging area so as to form a first insulating sheet; and depositing a second insulating film to cover the second metal strip in the packaging area so as to form a second insulating sheet, wherein the array substrate further includes the first insulating sheet and the second insulating sheet.

The adhesion force between the frame glue and the array substrate is strengthened by forming the first/second insulating sheets.

Optionally, when the first insulating sheet is positioned between the first metal strip and the second metal strip, the first insulating sheet in an area between the first metal lines is etched before the second metal film is deposited.

In this way, the array substrate has a greater height difference in this area, thereby further increasing the contact area between the frame glue and the array substrate.

Optionally, when the first insulating sheet is positioned between the first metal strip and the second metal strip, the second insulating sheet in an area between the second metal lines is etched but it is not etched through before the frame glue is coated.

In this way, the array substrate has a greater height difference in this area, thereby further increasing the contact area between the frame glue and the array substrate.

Optionally, the method further includes: forming a gate electrode layer in the display area; covering the gate electrode layer in the display area to form a first insulating layer; forming a source/drain electrode layer in the display area; and covering the source/drain electrode layer in the display area to form a second insulating layer, wherein the array substrate further includes the gate electrode layer, the first insulating layer, the source/drain electrode layer and the second insulating layer.

Optionally, one of the first metal strip and the second metal strip, and the gate electrode layer are positioned in a same layer and manufactured in an identical patterning process, and the other one of the first metal strip and the second metal strip, and the source/drain electrode layer are positioned in a same layer and manufactured in an identical patterning process.

By forming the first and second metal strips through the above mode, the manufacturing process of the display panel is simplified.

Optionally, the method further includes: forming a shading metal layer in the display area; and covering the shading metal layer in the display area to form a third insulating layer, wherein the array substrate further includes the shading metal layer and the third insulating layer; and one of the first metal strip and the second metal strip, and the shading metal layer are positioned in a same layer and manufactured in an identical patterning process, and the other one of the first metal strip and the second metal strip, and one of the gate electrode layer and the source/drain electrode layer are positioned in a same layer and manufactured in an identical patterning process.

By forming the first and second metal strips through the above mode, the manufacturing process of the display panel is simplified, and the structure types of the display panel is enriched.

Optionally, the method further includes: forming a fourth metal layer in the display area; and covering the shading metal layer in the display area to form a fourth insulating layer, wherein the array substrate further includes the fourth metal layer and the fourth insulating layer; and one of the first metal strip and the second metal strip, and the fourth metal layer are positioned in a same layer and manufactured in an identical patterning process, and the other one of the first metal strip and the second metal strip, and one of the gate electrode layer and the source/drain electrode layer are positioned in a same layer and manufactured in an identical patterning process.

By forming the first and second metal strips through the above mode, the manufacturing process of the display panel is simplified, and the structure types of the display panel is enriched.

The above process steps are introduced and illustrated in detail by the foregoing embodiments and will not be repeated here.

Figure 12:
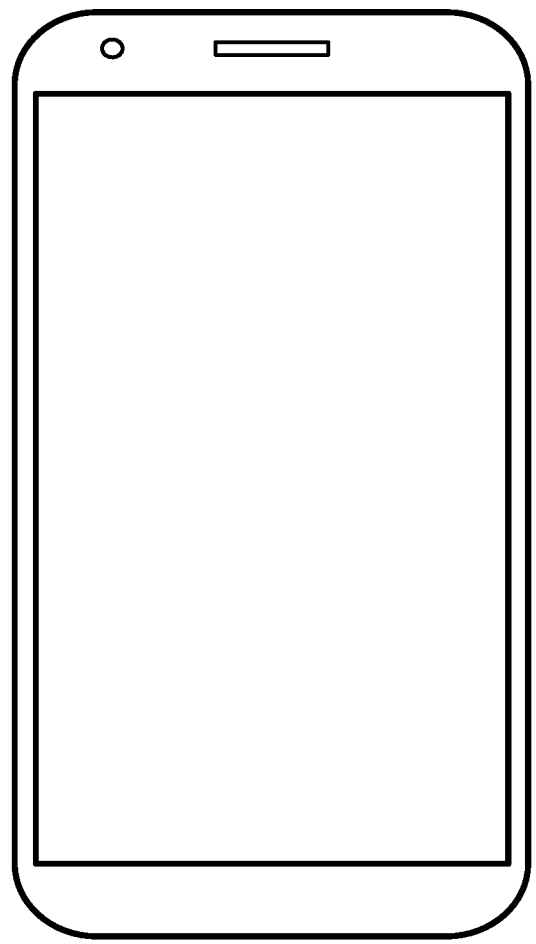
FIG. 12 shows a schematic structure diagram of the display panel in accordance with one embodiment of the present application.

The present application further discloses a display device, as shown in FIG. 12. Wherein, the display device 1200 may include the display panel described above. It should be understood by those skilled in the art that the display device may further include some other known structures in addition to the display panel described above. In order not to obscure the focus of the present embodiment, these known structures will no longer be further described.

The display device of the present application may be any device containing the display panel described above, including but not limited to, as shown in FIG. 12, a cellular mobile phone 1200, a tablet computer, a computer display, a display applied to a smart wearable device, a display device applied to means of transportation, such as an automobile, and the like. As long as a display device contains the structure of the display panel disclosed by the present application, it is deemed to fall within the scope of protection of the present application.

According to the display panel, the manufacturing method of the display panel, and the display device provided by the present application, the contact area between the frame glue and the array substrate is increased, thereby improving the reliability of packaging.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A display panel with an array substrate having a thickness varying in a packaging area, comprising the array substrate, a cover plate and frame glue for gluing the array substrate and the cover plate together, wherein the array substrate comprises a display area and the packaging area surrounding the display area, wherein the packaging area comprises a first metal layer and a second metal layer, and wherein the frame glue is arranged in the packaging area;
wherein the first metal layer comprises a plurality of first metal lines, the second metal layer comprises a plurality of second metal lines, and the plurality of first metal lines and the plurality of second metal lines intersect to form a net-like structure; and
wherein in a direction perpendicular to the display panel, the array substrate has a maximum thickness at locations where one of the plurality of first metal lines intercepts one of the plurality of second metal lines.

2. The display panel according to claim 1, wherein the array substrate further comprises a first insulating sheet and a second insulating sheet arranged in the packaging area; and
the first insulating sheet covers the first metal layer, and the second insulating sheet covers the second metal layer.

3. The display panel according to claim 2, wherein the array substrate further comprises a gate electrode layer, a first insulating layer, a source/drain electrode layer and an second insulating layer arranged in the display area; and
wherein the first insulating layer covers the gate electrode layer, and the second insulating layer covers the source/drain electrode layer.

4. The display panel according to claim 3, wherein one of the first metal layer and the second metal layer is positioned in a same layer as the gate electrode layer and is manufactured in a same patterning process as the gate electrode layer, and the other one of the first metal layer and the second metal layer is positioned in a same layer as the source/drain electrode layer and is manufactured in a same patterning process as the source/drain electrode layer.

5. The display panel according to claim 3, wherein the array substrate further comprises a shading metal layer and a third insulating layer arranged in the display area, and wherein the third insulating layer covers the shading metal layer; and
wherein one of the first metal layer and the second metal layer is disposed in a same layer as the shading metal layer and is manufactured in a same patterning process as the shading metal layer; and
wherein another one of the first metal layer and the second metal layer is disposed in a same layer as one of the gate electrode layer and the source/drain electrode layer and is manufactured in a same patterning process as the one of the gate electrode layer and the source/drain electrode layer.

6. The display panel according to claim 3, wherein the array substrate further comprises a fourth metal layer and a fourth insulating layer arranged in the display area, and the fourth insulating layer covers the fourth metal layer; and
wherein one of the first metal layer and the second metal layer is positioned in a same layer as the fourth metal layer and is manufactured in a same patterning process as the fourth metal layer, and another one of the first metal layer and the second metal layer is positioned in a same layer as one of the gate electrode layer and the source/drain electrode layer and is manufactured in a same patterning process as the one of the gate electrode layer and the source/drain electrode layer.

7. The display panel according to claim 2, wherein the first insulating sheet and/or the second insulating sheet comprise silicon nitride and silicon oxide.

8. The display panel according to claim 1, wherein the display panel is an organic light-emitting display panel.

9. A method for manufacturing a display panel with an array substrate having a thickness varying in a packaging area, comprising:
providing the array substrate having a display area and the packaging area, wherein the packaging area surrounds the display area;
depositing a first metal film in the packaging area;
etching the first metal film to form a first metal layer;
depositing a first insulating sheet to cover the first metal layer in the packaging area;
depositing a second metal film over the first metal film in the packaging area;

etching the second metal film to form a second metal layer;

depositing a second insulating sheet to cover the second metal layer in the packaging area;

coating frame glue in the packaging area; and placing a cover plate over the array substrate and curing the frame glue to attach the cover plate and the array substrate together, wherein the array substrate comprises the first metal layer and the second metal layer in the packaging area on a side of the display area, wherein the first metal layer comprises a plurality of first metal lines, the second metal layer comprises a plurality of second metal lines, wherein the plurality of first metal lines and the plurality of second metal lines intersect; and wherein in a direction perpendicular to the display panel, the array substrate has a maximum thickness at locations where one of the plurality of first metal lines intercepts one of the plurality of second metal lines.

10. The method according to claim 9, wherein when the first insulating sheet is disposed between the first metal layer and the second metal layer, wherein the first insulating sheet is etched to form the first metal lines before the second metal film is deposited.

11. The method according to claim 9, wherein when the first insulating sheet is positioned between the first metal layer and the second metal layer, the second insulating sheet in an area between the second metal lines is etched but is not etched through before the frame glue is coated.

12. The method according to claim 9, further comprising:

forming a gate electrode layer in the display area;

covering the gate electrode layer in the display area to form a first insulating layer;

forming a source/drain electrode layer in the display area; and covering the source/drain electrode layer in the display area to form a second insulating layer, wherein the array substrate further comprises the gate electrode layer, the first insulating layer, the source/drain electrode layer and the second insulating layer.

13. The method according to claim 12, wherein one of the first metal layer and the second metal layer is positioned in a same layer as the gate electrode layer and is manufactured in a same patterning process as the gate electrode layer, and another one of the first metal layer and the second metal layer is positioned in a same layer as the source/drain electrode layer and is manufactured in a same patterning process as the source/drain electrode layer.

14. The method according to claim 12, further comprising:

forming a shading metal layer in the display area; and covering the shading metal layer in the display area to form a third insulating layer, wherein the array substrate further comprises the shading metal layer and the third insulating layer; and one of the first metal layer and the second metal layer is positioned in a same layer as the shading metal layer and is manufactured in a same patterning process as the shading metal layer, and another one of the first metal layer and the second metal layer is positioned in a same layer as one of the gate electrode layer and the source/drain electrode layer and is manufactured in a same patterning process as the one of the gate electrode layer and the source/drain electrode layer.

15. The method according to claim 12, further comprising:

forming a fourth metal layer in the display area; and covering the fourth metal layer in the display area to form a fourth insulating layer, wherein the array substrate further comprises the fourth metal layer and the fourth insulating layer; and one of the first metal layer and the second metal layer is positioned in a same layer as the fourth metal layer and is manufactured in a same patterning process as the fourth metal layer, and another one of the first metal layer and the second metal layer is positioned in a same layer as one of the gate electrode layer and the source/drain electrode layer and is manufactured in a same patterning process as the one of the gate electrode layer and the source/drain electrode layer.

16. A display device, comprising a display panel with an array substrate having a thickness varying in a packaging area, comprising the array substrate having a display area and the packaging area surrounding the display area, a cover plate and frame glue for gluing the array substrate and the cover plate together, wherein the array substrate comprises a first metal layer and a second metal layer on the packaging area surrounding a display area, and the frame glue is arranged in the packaging area;

wherein in the packaging area on a side of the display area, the first metal layer comprises a plurality of first metal lines, the second metal layer comprises a plurality of second metal lines, and the plurality of first metal lines and the plurality of second metal lines intersect; and wherein in a direction perpendicular to the display panel, the array substrate has a maximum thickness at locations where one of the plurality of first metal lines intercepts one of the plurality of second metal lines.

17. The display device according to claim 16, wherein the array substrate further comprises a first insulating sheet and a second insulating sheet arranged in the packaging area; and wherein the first insulating sheet covers the first metal layer, and wherein the second insulating sheet covers the second metal layer.

18. The display device according to claim 17, wherein the array substrate further comprises a gate electrode layer, a first insulating layer, a source/drain electrode layer and a second insulating layer arranged in the display area; and wherein the first insulating layer covers the gate electrode layer, and the second insulating layer covers the source/drain electrode layer.

19. The display device according to claim 18, wherein one of the first metal layer and the second metal layer is positioned in a same layer as the gate electrode layer and is manufactured in a same patterning process as the gate electrode layer, and the other one of the first metal layer and the second metal layer is positioned in a same layer as the source/drain electrode layer and is manufactured in a same patterning process as the source/drain electrode layer.

* * * * *